United States Patent Office 3,519,578
Patented July 7, 1970

3,519,578
CELLULAR COMPOSITIONS
Geoffrey Allen, Victor Bryan, and Robert Alfred Darrall, Manchester, England, assignors to Imperial Chemical Industries Limited, Millbank, London, England, a corporation of Great Britain
No Drawing. Filed Sept. 6, 1966, Ser. No. 577,531
Claims priority, application Great Britain, Sept. 10, 1965, 38,687/65
Int. Cl. C08j *1/20;* C08f *47/10*
U.S. Cl. 260—2.5   10 Claims

ABSTRACT OF THE DISCLOSURE

This invention relates to foaming a hydrocarbon polymer with a dinitrosopentamethylene tetramine blowing agent and the improvement which comprises adding a solid salt of urea with an organic acid to prevent the development of obnoxious odor from the decomposition of the blowing agent.

---

This invention relates to cellular compositions.

Cellular compositions may be prepared from polymers such as natural or synthetic rubbers, or polyolefines such as polyethylene or polypropylene by blending with the polymer a blowing agent such as dinitrosopentamethylenetetramine and heating the mix to generate nitrogen. The cellular compositions so obtained frequently possess an obnoxious odour, and it has now been found that the incorporation into the mix before heating of certain urea salts hinders or prevents the development of this odour.

According to the invention therefore there is provided a process for the preparation of cellular compositions which comprises the steps of blending dinitrosopentamethylenetetramine, a solid salt of an optionally substituted urea with an organic acid, and an addition polymer and heating the mixture to generate nitrogen.

As addition polymers there may be mentioned hydrocarbon polymers such as natural rubber, synthetic rubbers such as polymers including stereospecific polymers of butadiene and isoprene, and copolymers of these with each other and with olefins such as styrene, isobutylene, ethylene, and propylene and polymers and copolymers of these with each other. The process is of particular advantage in the manufacture of cellular compositions from low density polyethylene.

There may also be used other addition polymers such as polychlorobutadiene and copolymers of butadiene with acrylonitrile or methylmethacrylate.

As organic acids which may afford with urea or substituted ureas solid salts suitable for use in the process of the invention there may be mentioned for example benzenesulphonic acid, toluenesulphonic acid, methanesulphonic acid, trichloromethanesulphinic acid, chloroacetic acid, trichloroacetic acid, cyanacetic acid and particularly oxalic acid and homologous alkanedioic acids such as malonic, succinic, glutaric and adipic acids or mixtures of these, and alkenedioic acids such as maleic and fumaric acids.

As ureas which may afford solid salts with the above acids there may be mentioned in particular urea itself and also substituted ureas such as for example methylurea, ethylurea, n-propylurea, isopropylurea, isobutylurea, cyclohexylurea and ethylene-bis-urea.

In general the salts may be prepared by conventional methods, for example by dissolving the urea and acid in appropriate proportions in a hot solvent such as water or water/ethanol mixture and cooling the solution when the salt separates.

In suitable cases it is convenient to add to the addition polymer either separately or in the form of mechanical mixes ingredients which can react in the mix to give the optionally substituted urea salts used in the invention, for example oxalic, sulphamic or p-toluenesulphonic acid or succinic, glutaric, adipic or maleic acid or mixtures of these in conjunction with urea.

If desired the urea salt may be mixed with suitably stabilised dinitrosopentamethylenetetramine before blending with the addition polymer. Conventional stabilisers, such as calcium carbonate, may also be present in the dinitrosopentamethylenetetramine.

The mixing may be carried out by blending the ingredients in powder form and using the mixed powder for the subsequent shaping and blowing operations. Alternatively, conventional mixing techniques for compounding polymeric materials, e.g. use of heated roller mills or internal mixers or extrusion-compounders may be employed. The resulting compounded mass may be used for subsequent shaping and blowing operations or it may be powdered and used for blowing into the required shape.

The amount of urea salt or ingredients thereof which may be used is between 0.1 and 10% and preferably between 0.5 and 5% of the weight of the addition polymer although larger amounts may be used if desired.

Dinitrosopentamethylenetetramine is used in the amounts conventional in the manufacture of cellular compositions, preferably between 0.5 and 10% of the weight of the addition polymer although more or less can be used if desired.

The temperature of heating may be any temperature conventionally used in the manufacture of cellular compositions using dinitrosopentamethylenetetramine, preferably between about 130 and about 200° C. Activators, such as urea, phthalic anhydride, 4-benzylphthalic anhydride, salicylic acid, maleic anhydride or stearic acid may also be added to permit blowing at temperatures which are at the lower end of the temperature range, particularly when using rubbery polymers, but some of the urea salts used in the process of the invention are themselves activators.

Other additives conventionally used in the manufacture of cellular compositions may also be added to the addition polymer before heating, for example pigments, antioxidants, anti-adhesive agents, plasticisers, and dispersing aids, and cross-linking agents.

The use of these urea salts in the process of the invention permits the manufacture of cellular products free from obnoxious odours and further hinders the formation of discoloured products.

A further advantage of the use of the salts of this invention in rubber is that, unlike urea or substituted ureas, these compounds do not appreciably interfere with the vulcanisation of the rubber. Urea tends to activate vulcanisation and necessitates a reduction in accelerator usage.

The invention is illustrated but not limited by the following examples in which all parts and percentages are by weight unless otherwise stated.

EXAMPLE 1

To 100 parts by weight of polyethylene powder (all passing through 40 mesh B.S. sieve) are added (a) 1 part of a commercially stabilised dinitrosopentamethylenetetramine powder and (b) 1 part of urea oxalate powder (prepared from two molecular proportions of urea and one of oxalic acid), and the mixture is dry tumbled to give a uniform powder composition. This mixture is placed in a metal mould and heated in an air oven kept at 180° C. for 30 minutes. The mould with its contents is cooled to room temperature by spraying with water and the cellular polyethylene moulding is removed. The product thus obtained is free from objectionable odour or discoloration.

Repetition of the above experiment but using in place of (b) 1 part of an equimolecular mixture of finely powdered urea and oxalic acid gives a substantially similar result.

Repetition of the experiment but using only one of the two additives (a) or (b) gives hardly any blowing.

Repetition of the experiment using only (a) but heating the mixture for 45 minutes at 235° C. produces an adequate degree of blow but there is a strong formaldehyde-like odour and the resulting cellular product is discoloured and also adheres to the mould excessively.

Repetition of the experiment using (a) and 0.5 part of finely powdered phthalic anhydride as an example of conventional type activator gives a cellular product with a strong formaldehyde-like odour and which is discoloured brown.

Repetition of the experiment using (a) and one part of finely powdered urea gives a cellular product but there is a strong ammonia-like odour present.

EXAMPLE 2

(i) To 100 parts by weight of polyethylene powder (all passing through 40 mesh B.S. sieve) are added (a) 1 part of a commercially stabilised dinitrosopentamethylenetetramine powder, (b) 1 part of a finely powdered mixture of 2 moles of urea and 1 mole of glutaric acid. The mixture is dry tumbled to give a uniform powder composition. This mixture is placed in a metal mould and heated in a platen press for 10 minutes at 175° C. under light pressure. It is then cooled for 5 minutes by passing cold water through press platens. A well blown cellular polyethylene article is obtained which is free from objectionable odour and shows no discolouration.

(ii) Repetition of the above experiment (1) using either succinic acid or adipic acid in place of glutaric acid gives a similar result in each case.

(iii) Repetition of the above experiment (1) but using in place of (b) 1 part of a mixture of urea salts derived from a mixture of approximately 6 parts of glutaric acid, 3 parts succinic acid and 1 part adipic acid, gives a substantially similar result.

(iv) Repetition of the above experiment (1) but using in place of (b) 1 part of methyl urea succinate give a substantially similar result.

(v) Repetition of the above experiment (1) but using in place of (b) 1 part of isobutyl urea oxalate gives an increase in blow and the characteristic odour of dinitrosopentamethylenetetramine is absent.

The methyl urea succinate used above is prepared by mixing a solution of 37 parts of methyl urea in 13 parts of hot water with a solution of 29.5 parts of succinic acid in 45 parts of hot water, filtering the hot mixture, and allowing the cooled filtrate to stand. Methyl urea succinate, melting at a temperature from 105 to 106° C., crystallises out and is isolated by filtration and washing with a little cold water.

The isobutylurea oxalate used above is prepared by mixing a solution of 38.7 parts of isobutylurea in 100 parts of hot water with a solution of 21 parts of oxalic acid in 21 parts of hot water, filtering the hot mixture, and allowing the cooled filtrate to stand. Isobutylurea oxalate, melting at a temperature from 79 to 80° C., crystallises out and is isolated by filtration. The product so obtained contains some isobutylurea impurity but is satisfactory for use in the process of the invention.

EXAMPLE 3

To 100 parts by weight of commercial grade of stabilised isotactic polypropylene powder (all passing through 40 mesh B.S. sieve are added (a) 1 part of a commercially stabilised dinitrosopentamethylenetetramine powder (b) 1 part of mixed urea salts (as in Example 2 (iii)) and the mixture dry tumbled to give a uniform powder composition. This mixture is extruded through a conventional plastic extruder. The temperature settings from the die towards the feed-hopper are 210° C., 200° C., and 190° C. The zone in the vicinity of the hopper is water cooled. The extruded rod is of a uniform cellular texture and free from objectionable odour or discolouration.

EXAMPLE 4

(1) To a microcellular rubber compound consisting of:

| | Parts by wt. |
|---|---|
| Natural rubber | 80 |
| Butadiene/styrene copolymer (70% styrene) | 20 |
| Peptiser | 1 |
| Zinc oxide | 5 |
| Stearic acid | 3 |
| Calcium silicate | 50 |
| China clay | 30 |
| Petroleum jelly | 5 |
| Paraffin wax | 1.5 |
| Cyclohexylbenzthiazylsulphenamide | 0.7 |
| Antioxidant (a phenol condensation product) | 1 |
| Sulphur | 2.7 | are added (a) 4 parts of a commercially stabilised dinitrosopentamethylenetetramine powder, (b) 4 parts of urea salts derived from a mixture of approximately 6 parts glutaric acid, 3 parts succinic acid and 1 part adipic acid. The mixture is vulcanised in a steam heated hydraulic press for 12 minutes at 143° C. using approximately 800 lb. per square inch hydraulic pressure. The mould is completely filled and expansion occurs upon release of hydraulic pressure at the end of the curing cycle to provide the microcellular rubber, which has a considerably reduced odour as compared to using the blowing agent alone without the addition of the mixture of urea salts.

(2) Repetition of the above experiment, but using in place of (b) 4 parts of an equimolecular mixture of finely powdered urea and oxalic acid gives a substantially similar result.

EXAMPLE 5

To a cellular rubber compound consisting of:

| | Parts by wt. |
|---|---|
| Natural rubber | 100 |
| Peptiser | 0.2 |
| Zinc oxide | 5 |
| Stearic acid | 1 |
| Glycerine | 5 |
| Process oil | 15 |
| Cyclohexylbenzthiazylsulphenamide | 1 |
| Sulphur | 2.5 | are added 5 parts of a commercially stabilised dinitrosopentamethylenetetramine powder and 3 parts of a mixture of urea salts as used in (b) Example 1.

The mixture is vulcanised for 10 minutes at 153° C. by partially filling the mould, to provide a cellular rubber. Mould loading may be varied between 10-80% in order to obtain cellular rubbers of varying densities and cell structures.

The addition of the mixture of urea salts (b) again results in samples of rubber having a reduced odour as against a control without the mixture of urea salts.

EXAMPLE 6

To a polychloroprene compound consisting of:

| | Parts by wt. |
|---|---|
| Polychloroprene (type GS) | 100 |
| Diorthotolylguanidine | 0.5 |
| Magnesium oxide | 4 |
| Factice (vulcanised oil) | 10 |
| Process oil | 10 |
| Antioxidant (an octylated diphenylamine) | 2 |
| Zinc oxide | 5 |
| China clay | 35 |
| Titanium dioxide | 10 |
| Stearic acid | 5 | are added 5 parts of dinitrosopentamethylenetetramine powder as (a), Example 1, together with 5 parts of a mixture of urea salts as (b), Example 1.

The mixture is vulcanised for 15 minutes at 141° C. in a similar manner to that described in Example 1 and again a reduced odour results.

EXAMPLE 7

To a polychloroprene compound consisting of:

| | Parts by wt. |
|---|---|
| Polychloroprene (type WRT) | 100 |
| Peptiser | 0.5 |
| Magnesium oxide | 4 |
| Stearic acid | 5 |
| Process oil | 25 |
| Antioxidant (an octylated diphenylamine) | 2 |
| Zinc oxide | 5 |
| China clay | 50 |
| Aluminium silicate | 35 |
| Titanium dioxide | 10 | are added 10 parts dinitrosopentamethylenetetramine powder as (a), Example 1, together with 5 parts of a mixture of urea salts as (b), Example 1.

The mixture is vulcanised for 15 minutes at 153° C. in a similar manner to that described in Example 1, and again a reduced odour results.

EXAMPLE 8

To a microcellular compound consisting of:

| | Parts by wt. |
|---|---|
| Oil-extended butadiene/styrene | 70 |
| Butadiene/styrene copolymer (70% styrene) | 30 |
| Zinc oxide | 4 |
| Stearic acid | 2 |
| Silica (finely divided) | 30 |
| China clay | 50 |
| Coumarone indene resin | 2 |
| Paraffin wax | 1 |
| Antioxidant (a phenol condensation product) | 1 |
| Dibenzthiazyldisulphide | 1 |
| Sulphur | 2.5 |
| Diethylene glycol | 2 | are added 5 parts dinitrosopentamethylenetetramine powder as (a), Example 1, together with 2.5 parts of a mixture of urea salts as (b) Example 1.

The mixture is vulcanised for 10 minutes at 150° C. in a similar manner to that described in Example 1 and a reduced odour results.

EXAMPLE 9

To a chlorsulphonated polyethylene microcellular compound consisting of:

| | Parts by wt. |
|---|---|
| Chlorsulphonated polyethylene | 100 |
| Polyethylene | 3 |
| Petroleum jelly | 5 |
| Calcium carbonate | 40 |
| Titanium dioxide | 10 |
| Process oil | 20 |
| Antioxidant (a phenol condensation product) | 2 |
| Magnesium oxide | 10 |
| Dipentamethylenethiuram tetrasulphide | 1 |
| Dibenzthiazyl disulphide | 0.25 | are added 5 parts of dinitrosopentamethylenetetramine powder as (a) Example 1, together with 5 parts of a mixture of urea salts as (b) Example 1.

The mixture is vulcanised for 12 minutes at 153° C. in a similar manner to that described in Example 1, and a reduced odour results.

What we claim is:

1. In a process for the preparation of cellular compositions comprising the steps of blending dinitrosopentamethylenetetramine and a hydrocarbon polymer composition selected from the group consisting of (a) vulcanizable natural rubber compositions containing a vulcanizing agent, (b) vulcanizable polybutadiene compositions containing a vulcanizing agent, (c) vulcanizable polyisoprene compositions containing a vulcanizing agent, (d) vulcanizable copolymers of butadiene or isoprene with at least one olefin selected from the group consisting of a styrene, isobutylene, ethylene and propylene and with a vulcanizing agent and (e) a polyolefin selected from the group consisting of polyethylene, polypropylene and copolymers of ethylene and propylene to form a mixture, and heating the mixture to generate nitrogen, thereby forming said cellular composition, the improvement comprising incorporating in said mixture, prior to heating to generate nitrogen, a solid salt of urea with an organic acid selected from the group consisting of oxalic, malonic, succinic, glutaric and adipic acids and their mixtures, whereby the development of an obnoxious odor is hindered or prevented.

2. A process as claimed in claim 1 wherein the salt is derived from a mixture of succinic, glutaric and adipic acids.

3. A process as claimed in claim 2 wherein the relative proportions of succinic, glutaric and adipic acids are about 3:6:1.

4. A process as claimed in claim 1 wherein the organic acid is oxalic acid.

5. A process as claimed in claim 1 wherein the urea and organic acid are added in the form of mechanical mixtures to the said hydro-carbon polymer.

6. A process as claimed in claim 1 wherein the urea and organic acid are added separately to the said hydrocarbon polymer.

7. A process as claimed in claim 1 wherein the amount of the salt of the urea used is between 0.1 and 10%, of the weight of the said hydrocarbon polymer.

8. A process as claimed in claim 1 wherein the amount of dinitrosopentamethylenetetramine used is between 0.5 and 10% of the weight of the said hydrocarbon polymer.

9. A process as claimed in claim 1 wherein the heating is carried out at a temperature between 130 and 200° C.

10. The process as claimed in claim 7 wherein between 0.5 and 5.0% of said salt, based on the weight of said additional polymer, is used.

References Cited

UNITED STATES PATENTS

| 2,634,243 | 4/1953 | Glenn | 260—2.5 |
| 2,891,017 | 6/1959 | Kern et al. | 260—2.5 |
| 3,231,525 | 1/1966 | Kelly et al. | |
| 3,306,861 | 2/1967 | Justice. | |
| 2,824,076 | 2/1958 | Fuller. | |

MURRAY TILLMAN, Primary Examiner

M. FOELAK, Assistant Examiner

U.S. Cl. X.R.

260—724, 45.7, 41, 41.5, 5

PO-1050
(5/69)

UNITED STATES PATENT OFFICE
CERTIFICATE OF CORRECTION

Patent No. 3,519,578          Dated July 7, 1970

Inventor(s) Geoffrey Allen, Victor Bryan, Robert Darrall & Vijay
                                                         Ratna Sharma It is certified that error appears in the above-identified patent and that said Letters Patent are hereby corrected as shown below:

In the heading, add Vijay Ratna Sharma as a joint inventor.

SIGNED AND
SEALED
OCT 20 1970

(SEAL)
Attest:

Edward M. Fletcher, Jr.
Attesting Officer

WILLIAM E. SCHUYLER, JR.
Commissioner of Patents